(12) United States Patent
Parrish

(10) Patent No.: US 6,704,879 B1
(45) Date of Patent: Mar. 9, 2004

(54) DYNAMICALLY CONTROLLING A POWER STATE OF A GRAPHICS ADAPTER

(75) Inventor: Sean T. Parrish, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/383,470

(22) Filed: Aug. 26, 1999

(51) Int. Cl.[7] ............................ G06F 1/26; G06F 15/177
(52) U.S. Cl. ............................ 713/322; 713/1; 713/340
(58) Field of Search .............................. 713/322, 300, 713/340, 323, 500, 1

(56) References Cited

U.S. PATENT DOCUMENTS

| | | |
|---|---|---|
| 5,167,024 A | 11/1992 | Smith et al. |
| 5,230,074 A | 7/1993 | Canova, Jr. et al. |
| 5,345,392 A | 9/1994 | Mito et al. |
| 5,469,553 A | 11/1995 | Patrick |
| 5,481,733 A | 1/1996 | Douglis et al. |
| 5,493,670 A | 2/1996 | Douglis et al. |
| 5,560,022 A | 9/1996 | Dunstan et al. |
| 5,570,025 A * | 10/1996 | Lauritsen et al. ............ 324/433 |
| 5,613,135 A | 3/1997 | Sakai et al. |
| 5,630,148 A | 5/1997 | Norris |
| 5,682,273 A | 10/1997 | Hetzler |
| 5,692,204 A | 11/1997 | Rawson et al. |
| 5,694,607 A | 12/1997 | Dunstan et al. |
| 5,719,510 A * | 2/1998 | Weidner ..................... 327/119 |
| 5,760,636 A | 6/1998 | Noble et al. |
| 5,796,391 A * | 8/1998 | Chiu et al. .................. 345/204 |
| 5,799,069 A * | 8/1998 | Weston et al. ........... 379/93.33 |
| 5,812,860 A * | 9/1998 | Horden et al. ............... 713/322 |
| 5,886,689 A * | 3/1999 | Chee et al. .................. 345/212 |
| 5,958,058 A | 9/1999 | Barrus |
| 5,991,883 A * | 11/1999 | Atkinson ..................... 713/300 |
| 6,078,319 A * | 6/2000 | Bril et al. .................... 345/211 |

FOREIGN PATENT DOCUMENTS

JP    11065719 A *  3/1999 .............. G06F/1/32

OTHER PUBLICATIONS

IBMTDB, Automatic Video Frequency/Mode Detection and Adjustment, Mar. 1995, IBM, vol. 38.*

United States patent application No. 08/896,411 Dated Aug. 10, 2000 Entitled "Method of Managing Power for a Computer System and Generating Application Threshold Warnings".

* cited by examiner

*Primary Examiner*—Dennis M. Butler
*Assistant Examiner*—Suresh K Suryawanshi
(74) *Attorney, Agent, or Firm*—Trop, Pruner & Hu, P.C.

(57) ABSTRACT

A computer system includes a power source to provide either alternating current from an electrical outlet or direct current from a battery pack. The system also includes a graphics adapter having a clock device that may be regulated based on a power state of the power source. The clock device of the graphics adapter may be set to a high frequency to provide increased graphics performance when the power source is furnishing alternating current to the system. Alternatively, when the power source is providing direct current, the clock device of the graphics adapter may be set to a lower frequency to conserve power.

20 Claims, 2 Drawing Sheets

DYNAMICALLY CONTROLLING A POWER STATE OF A GRAPHICS ADAPTER

BACKGROUND

The invention relates generally to computer system graphics features, and more particularly to performance and power consumption of computer graphics adapters.

Computer systems utilize graphics for almost all aspects of user interaction. Conventional computer output is predominately graphical in nature, as exhibited by windowing environments, such as WINDOWS® 98 developed by MICROSOFT® Corporation. Windowing environments and other user interfaces also allow user input through graphics controls with devices such as a keyboard, a mouse, or a joystick. Additionally, graphical input and output are used for computer video game interaction. These video games, in turn, typically require high speed graphics processing. In order to meet demanding graphics processing standards, many graphics adapters now include dedicated controller chips.

Continuing advancements in semiconductor manufacturing processes enable the development of controller chips that operate at increasingly higher frequencies. Controller chips that operate at high clock speeds typically consume more power than controller chips running at lower clock speeds. Unfortunately, these high speed controller chips may cause the graphics subsystems to consume a substantial amount of power, a consumption that may deplete battery power sources used to power portable computers and other computing devices that have a limited power capacity.

SUMMARY

In one embodiment, the invention provides a method to reduce power consumption in a computer system that has a graphics adapter. The method includes determining a power state of the system and regulating a frequency of operation of the graphics adapter in response to the power state. In another embodiment of the invention, a graphics adapter is provided that includes a clock device to regulate operation of the adapter and a routine to modify a frequency of the clock device in response to a power state. In yet another embodiment, the invention provides a computer system having a graphics adapter and a power source with a power state. Also included in the computer system are a clock device to regulate operation of the graphics adapter and a routine to modify a frequency of the clock device in response to a power state.

DETAILED DESCRIPTION

Figure 1:
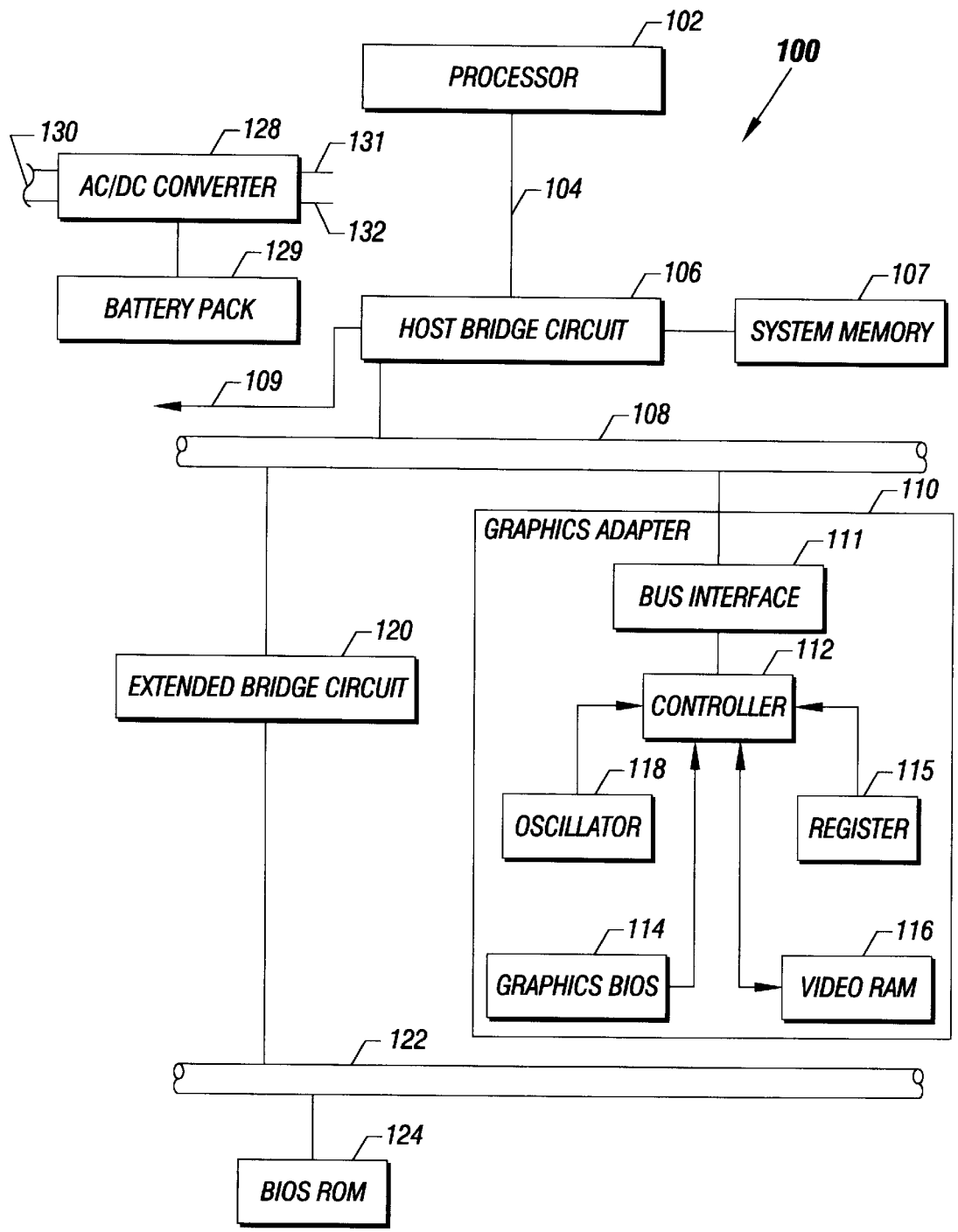
FIG. 1 shows illustrative computer system having a dynamically controlled graph adapter in accordance with the invention.

Referring to FIG. 1, an embodiment of a computer system 100 in accordance with the invention may include a graphics adapter 110 capable of operating at various frequencies depending on a power state of the system 100. The power state may include indications of alternating current (AC) or direct current (DC) power that may be furnished to various devices of the system 100 by an AC/DC converter 128 through power lines 131 and 132. The AC/DC converter 128 may provide AC power from an electrical outlet 130 or DC power from a battery pack 129. The graphics adapter 110 may also provide a graphics controller 112 that performs graphics computations, a graphics BIOS 114 to configure the adapter 110, and video random access memory (RAM) 116 for storage of graphics data, such as frame buffering information. Additionally, the graphics adapter 110 may include an oscillator 118 which may be any clock device that generates clock pulses to control the frequency at Which graphics operations are performed.

Figure 2:
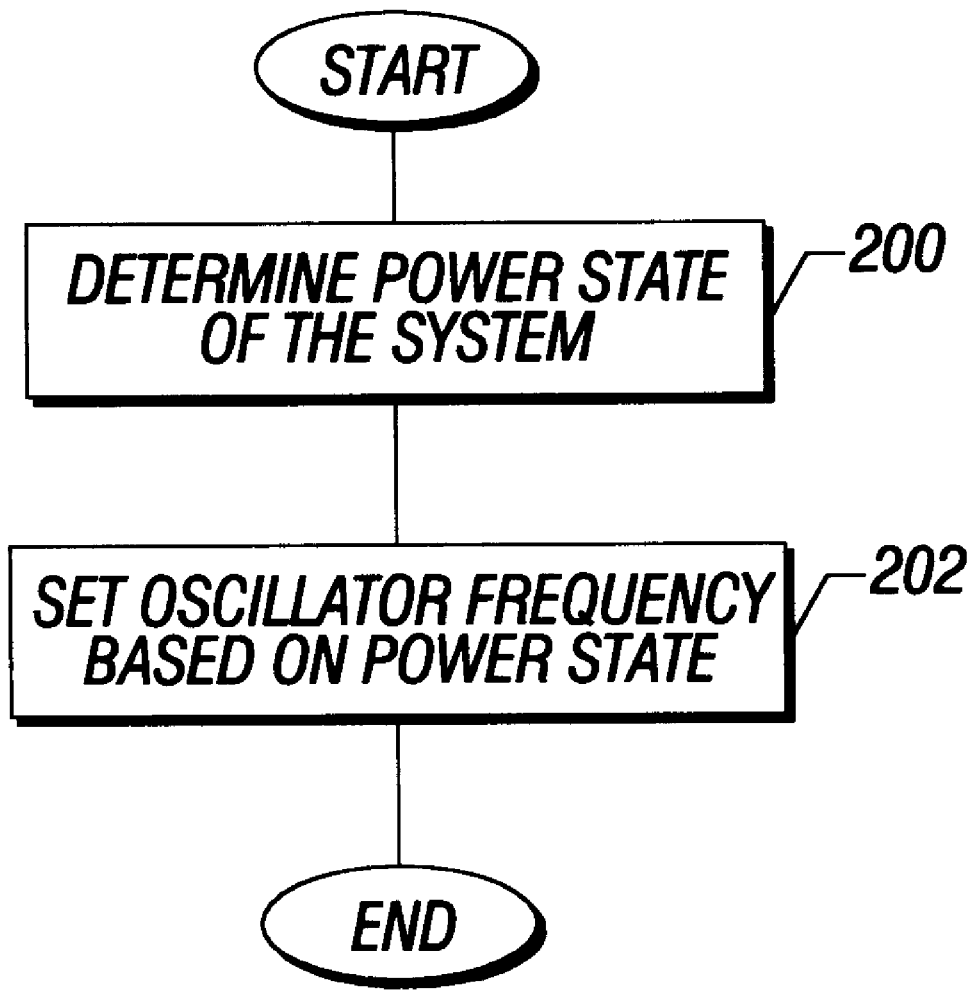
FIG. 2 shows a flow diagram illustrating a technique to set a frequency of an oscillator of the adapter in FIG. 1 in accordance with the invention.

When the system 100 is powered on, a processor 102 loads basic input/output system (BIOS) instructions from BIOS read only memory (ROM) 124 into system memory 107 to perform power on self test (POST) operations that check and configure devices of the system 100. Referring also to FIG. 2, during the POST operations, BIOS instructions may be performed to determine the power state of the computer system 100 at block 200, i.e., whether the AC/DC converter 128 is receiving AC power from the electrical outlet 130 or DC power from the battery pack 129. Once a determination has been made, the processor 102 may execute instructions of the graphics BIOS 114 to configure the graphics adapter 110 and set the speed of the oscillator 118 to a frequency corresponding to the power state of the system 100, as shown at block 202.

For example, if the battery pack 129 is powering the system 100, it may be desirable to limit power consumed by the graphics adapter 110 by lowering the frequency at which graphics operations are performed. With DC power from the battery pack 129, the oscillator 118 may be configured to generate clock pulses at a minimum frequency level for the graphics adapter 110. The Savage/MX graphics accelerator by S3® Incorporated has an operating frequency range of 83 Megahertz (MHz) to 143 MHz. Thus, when using a DC power supply, a Savage/MX graphics accelerator may be configured to operate at 83 MHz to consume a minimal amount of power. Alternatively, when power is supplied by an AC source such as the electrical outlet 130, power conservation may not be an important issue, and it may be desirable to operate the graphics adapter 110 at a higher frequency to provide better graphics performance. Accordingly, a Savage/MX graphics accelerator may be configured to operate at a 143 MHz when an AC power supply is used.

During operations of the computer system 100, a user may change from utilizing the battery pack 129 to drawing power from the electrical outlet 130 or vice versa. When the power state changes, the frequency of the oscillator 118 may be modified accordingly. A hardware device, such as the AC/DC converter 128, may generate a hardware interrupt in response to a change in the power state to invoke an interrupt handler, such as a BIOS routine. The interrupt handler may include instructions employing input/output (I/O) addressing techniques to notify the graphics adapter 110 of the change in the power state. The processor 102 may execute instructions of the interrupt handler to write data to an I/O address space. Essentially, the data is transmitted to a port that is mapped to a register 115 on the graphics adapter. The data in the register 115 may include indications of the power state of the computer system 100 including a residual power level, if using the battery pack 129. When data is stored in the register 115, a routine of the graphics BIOS 114 may be invoked to respond to the change in power supply by modifying the frequency of the oscillator 118.

In some embodiments, the oscillator 118 may be capable of generating clock pulses at several different selectable frequencies. For example, the oscillator 118 of the graphics adapter 110 may operate at 83, 100, 125, or 143 MHz depending on the power state. In this embodiment, the graphics adapter 110 may operate at 143 MHz if the system 100 is connected to AC power, for example. However, when the DC battery pack 129 is utilized, the oscillator 118 may be modified to operate at a lower frequency, wherein the specific lower frequency may be based on a percentage of remaining battery power. For example, if the battery pack 129 is operating at 100 percent of its capacity, the oscillator 118 may operate at 125 MHz. When the battery pack 129 is reduced to 75 percent of its capacity, an interrupt may be generated by the AC/DC converter 128 to lower the frequency to 100 MHz. Accordingly, when the battery pack 129 is depleted to only 50 percent of its capacity, the oscillator 118 may be modified further to operate at 83 MHz. Therefore, as the power level of a DC battery diminishes, the clock speed of the graphics adapter 110 may be modified to conserve power.

The graphics adapter 110 may also include a bus interface 111 to communicate with other devices in the system 100 through a bus. The bus interface 111 may enable a graphics adapter to utilize an Accelerated Graphics Port (AGP) 109 for high speed communications with the system memory 107. For example, the graphics adapter 110 may be coupled to the host bridge circuit's AGP interface 109. In another embodiment, the bus interface 111 enables the graphics adapter 110 to interact with a primary bus 108, which may conform to the Peripheral Component Interconnect (PCI) standard. The primary bus 108 may facilitate communication between the processor 102 and other devices of the system 100, such as the graphics adapter 110. The processor 102 may be connected to a host bridge circuit 106 through a processor bus 104. The host bridge circuit may allow the processor to access system memory 107 and to communicate with other devices over the primary bus 108. An illustrative host bridge circuit 106 is the 82443BX Host-to-PCI bridge device from Intel Corporation. The system 100 may also include a secondary bus 122 conforming to the Industry Standard Architecture (ISA), Extended Industry Standard Architecture (EISA), or the Low Pin Count (LPC) standard to facilitate communication with various input/output devices. The secondary bus 122 may be coupled to the primary bus 108 through an expansion bridge 120, such as the 82371AB PIIX4 IDE controller from Intel Corporation. One device coupled to the secondary bus 122 may be the BIOS ROM 124.

Several benefits may be gained by utilizing a graphics adapter with a variable frequency oscillator as provided by the invention. One benefit is that a graphics adapter in accordance with the invention may consume less power when connected to a DC power supply by operating at a lower frequency, thereby lengthening the period of use of a DC battery. Additionally, the invention allows for increased graphics performance when utilizing an AC power supply. Therefore, the invention provides a balance between performance and power consumption allowing maximum graphics performance while still conserving power.

While the invention has been disclosed with respect to a limited number of embodiments, numerous modifications and variations will be appreciated by those skilled in the art. For example, the invention is limited to a portable computer system such as that illustrated in FIG. 1, the invention is equally applicable to a desktop computer system. That is, a computer system that does not necessarily have a built-in battery pack 129. It is intended, therefore, that the following claims cover all such modifications and variations that may fall within the true spirit and scope of the invention.

What is claimed is:

1. A method to reduce power consumption in a computer system having a graphics adapter, comprising:

determining a power level of a battery in the computer system; and setting a first, normal frequency of operation of the graphics adapter in response to the power level being greater than a first level; and setting one of plural other non-zero frequencies of operation of the graphics adapter in response to the power level being at one of corresponding other levels less than the first level.

2. The method of claim 1, further comprising:

generating an interrupt in response to the power level being modified; and responding to the interrupt by modifying the frequency of operation to correspond to a modification of the power level.

3. The method of claim 1, wherein setting the frequency of operation comprises setting a frequency of a clock device of the graphics adapter.

4. An apparatus comprising:

a graphics adapter;

a battery coupled to the graphics adapter, the battery having a power level;

a clock device adapted to generate a clock pulse at a frequency to regulate operations of the graphics adapter; and a routine adapted to set a first frequency of the clock device in response to a first power level of the battery, to set a second frequency of the clock device in response to a second power level of the battery, and to set a third frequency of the clock device in response to a third power level of the battery.

5. The apparatus of claim 4, further comprising a bus interface adapted to communicate with a bus conforming to a Peripheral Component Interconnect standard.

6. The apparatus of claim 4, further comprising a bus interface adapted to communicate with a bus conforming to an Accelerated Graphics Port standard.

7. The apparatus of claim 4, further comprising an alternating current power source, the routine to set a fourth frequency of the clock device in response to detecting the alternating current power source is active.

8. The apparatus of claim 4, wherein the routine comprises a basic input/output system routine.

9. The method of claim 1, further comprising setting a second frequency, higher than the first frequency, of operation of the graphics adapter in response to detecting that the computer system is powered by an AC source.

10. The method of claim 9, further comprising changing the frequency of operation from the second frequency to the first frequency in response to detecting that the computer system has been switched from being powered by the AC source to being powered by the battery.

11. The apparatus of claim 4, wherein the routine is adapted to set at least another frequency of the clock device in response to at least another power level of the battery.

12. The apparatus of claim 4, wherein the first, second, and third frequencies are non-zero frequencies.

13. The apparatus of claim 4, further comprising a detector to indicate a change of power level of the battery.

14. A system comprising:

a processor;

a graphics device;

a battery; and a routine executable on the processor to cause a frequency of a clock of the graphics device to vary based on a detected power level of the battery, the routine to set one of more than two non-zero frequencies for the clock in response to detecting one of corresponding more than two power levels.

15. The system of claim 14, wherein the more than two frequencies comprise first, second, and third frequencies, and the more than two power levels comprise first, second, and third power levels of the battery, the routine to set the first frequency for the clock in response to detecting the first power level, to set the second frequency in response to detecting the second power level, and to set the third frequency in response to detecting the third power level.

16. The system of claim 15, wherein the more than two frequencies further comprise a fourth frequency, and the more than two power levels further comprise a fourth power level, the routine to set the fourth frequency for the clock in response to detecting the fourth power level.

17. The system of claim 14, further comprising an alternating current power source, the routine to set another frequency for the clock in response to detecting the alternating current power source is active.

18. The system of claim 14, wherein the frequencies are non-zero frequencies.

19. The system of claim 14, further comprising a controller to indicate a change in the power level of the battery.

20. The method of claim 3, wherein the clock device provides a clock signal, wherein setting the first, normal frequency of operation comprises setting a first frequency for the clock signal, and wherein the setting one of plural other non-zero frequencies of operation comprises setting one of plural other non-zero frequencies for the clock signal.

* * * * *